United States Patent
Krishnan et al.

(10) Patent No.: US 8,954,568 B2
(45) Date of Patent: Feb. 10, 2015

(54) METHOD AND SYSTEM FOR BUILDING AN ELASTIC CLOUD WEB SERVER FARM

(75) Inventors: Subramaniam Venkatraman Krishnan, Bangalore (IN); Amit Jaiswal, Bangalore (IN); Ravikiran Meka, Bangalore (IN); Jean-Christophe Counio, Kamataka (IN); Alejandro Abdelnur, San Francisco, CA (US); Ruchir Rajendra Shah, Kamataka (IN)

(73) Assignee: Yahoo! Inc., Sunnyvale, CA (US)

( * ) Notice: Subject to any disclaimer, the term of this patent is extended or adjusted under 35 U.S.C. 154(b) by 129 days.

(21) Appl. No.: 13/187,547

(22) Filed: Jul. 21, 2011

(65) Prior Publication Data

US 2013/0024496 A1    Jan. 24, 2013

(51) Int. Cl.
 *G06F 15/173* (2006.01)
 *G06F 15/16* (2006.01)
 *G06F 9/50* (2006.01)

(52) U.S. Cl.
 CPC .............. *G06F 9/505* (2013.01); *G06F 9/5072* (2013.01)
 USPC .......................................... 709/224; 709/203

(58) Field of Classification Search
 USPC .......................................... 709/224; 358/1.15
 See application file for complete search history.

(56) References Cited

U.S. PATENT DOCUMENTS

| | | | | |
|---|---|---|---|---|
| 5,774,668 | A * | 6/1998 | Choquier et al. | 709/223 |
| 6,850,986 | B1 * | 2/2005 | Peacock | 709/232 |
| 2004/0243843 | A1 * | 12/2004 | Kadobayashi et al. | 713/201 |
| 2009/0210528 | A1 * | 8/2009 | Swildens et al. | 709/224 |
| 2009/0327489 | A1 * | 12/2009 | Swildens et al. | 709/224 |
| 2012/0086978 | A1 * | 4/2012 | Uchikawa | 358/1.15 |
| 2012/0303489 | A1 * | 11/2012 | Robb et al. | 705/27.1 |

* cited by examiner

*Primary Examiner* — Emmanuel L Moise
*Assistant Examiner* — Mahran Abu Roumi
(74) *Attorney, Agent, or Firm* — James J. DeCarlo; Greenberg Traurig, LLP

(57) ABSTRACT

A method and system for building an elastic cloud web server farm. The method includes registering a web application on a serving cloud and copying the web application to a distributed store. A load of the web application is specified, and a plurality of nodes is added for the web application based on the load. A web server corresponding to a node of the plurality of nodes is then initialized. A web request is received from a user and a web server is selected from a list of available web servers to process the web request. The web request is further transmitted to the web server. A web response, based on the web request, is transmitted back to the user. The system includes a central registry, a distributed store, a process coordinator, one or more web servers, and a router.

16 Claims, 6 Drawing Sheets

METHOD AND SYSTEM FOR BUILDING AN ELASTIC CLOUD WEB SERVER FARM

TECHNICAL FIELD

Embodiments of the disclosure relate to the field of building an elastic cloud web server farm.

BACKGROUND

Internet has become a popular platform for storing information and accessing one or more web applications. Web application based processing is typically utilized for handling high throughput internet traffic. Conventionally, the web applications are hosted on a server farm. The server farm is defined as a cluster of server computers coupled to each other through a local area network (LAN). The server farm enables communication between the cluster of server computers and a user that deploys the web applications. However, the server farm does not provide necessary elasticity to the web applications. The server farm also lacks in providing isolation to each web application when multiple web applications are deployed simultaneously. Further, the server farm is unable to process large number of web applications.

The above limitation can be overcome by utilizing a cloud computing infrastructure. The cloud computing infrastructure deploys the web applications on one or more dedicated virtual machines. The cloud computing infrastructure allows sharing of the infrastructure when large number of the web applications is deployed simultaneously. The cloud computing infrastructure also provides different features, for example isolation, self healing and easy deployment of the web applications. However, the cloud computing infrastructure requires complex infrastructure for maintaining the dedicated virtual machines.

In the light of the foregoing discussion, there is a need for a method and system for deploying and processing multiple web applications efficiently.

SUMMARY

The above-mentioned needs are met by a method, a computer program product and a system for building an elastic cloud web server farm.

An example of a method of building an elastic cloud web server farm includes registering a web application on a serving cloud and copying the web application to a distributed store. The method also includes specifying a load of the web application and adding a plurality of nodes for the web application based on the load. The method further includes initializing a web server corresponding to a node of the plurality of nodes. Further, the method includes receiving a web request from a user, and selecting the web server from a list of available web servers to process the web request. Moreover, the method includes transmitting the web request to the web server, and transmitting a web response, based on the web request, to the user.

An example of a computer program product stored on a non-transitory computer-readable medium that when executed by a processor, performs a method of building an elastic cloud web server farm includes registering a web application on a serving cloud and copying the web application to a distributed store. The computer program product also includes specifying a load of the web application, adding a plurality of nodes for the web application based on the load, and initializing a web server corresponding to a node of the plurality of nodes. The computer program product further includes receiving a web request from a user and selecting the web server from a list of available web servers to process the web request. Further, the computer program product includes transmitting the web request to the web server. Moreover, the computer program product includes transmitting a web response, based on the web request, to the user.

An example of a system for building an elastic cloud web server farm includes a central registry that maintains a list of available web servers. The system also includes a distributed store that stores a plurality of web applications. The system further includes a process coordinator that registers a web application on a serving cloud, copies the web application to the distributed store, specifies a load of the web application, adds a plurality of nodes for the web application based on the load, and initializes a web server corresponding to a node of the plurality of nodes. Further, the system includes one or more web servers. Each web server comprises a map web engine that initializes a web server corresponding to a node of the plurality of nodes. Moreover, the system includes a router that receives a web request from a user, selects the web server from the list of available web servers to process the web request, transmits the web request to the web server, and transmits a web response, based on the web request, to the user.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

The above-mentioned needs are met by a method, computer program product and system for selecting advertisements based on user tags. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
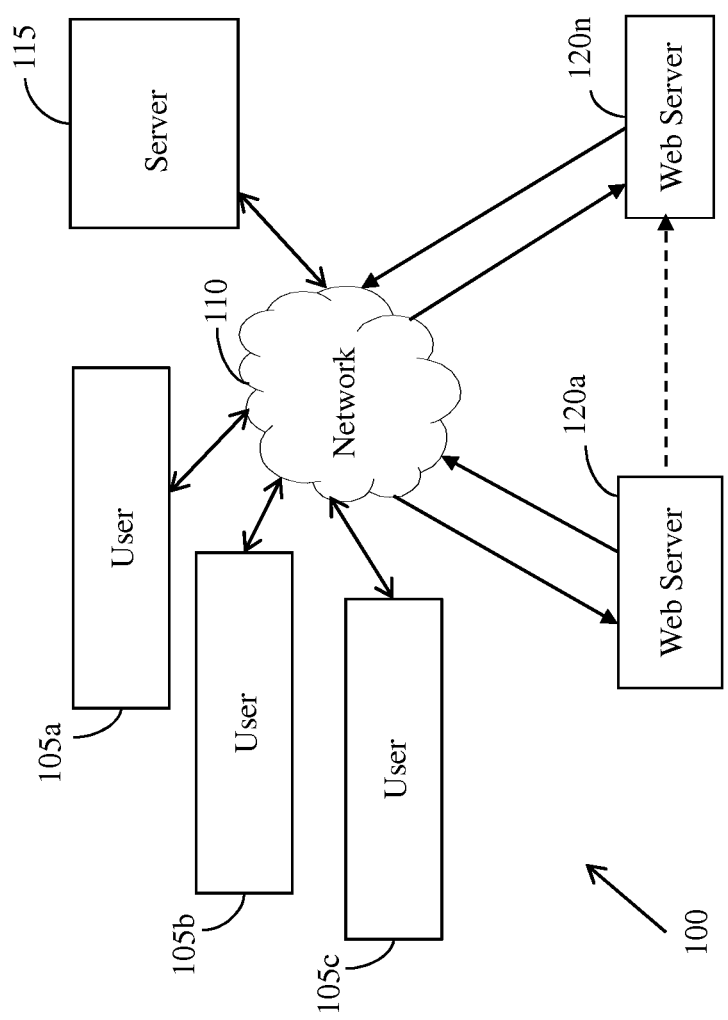
FIG. 1 is a block diagram of an environment, in accordance with which various embodiments can be implemented.

FIG. 1 is a block diagram of an environment 100, in accordance with which various embodiments can be implemented.

The environment 100 includes one or more users. Examples of the users include, but are not limited to, a user 105a, a user 105b, and a user 105c. The environment 100 also includes a network 110, a server 115 and one or more web servers, for example a web server 120a, a web server 120b, a web server 120c, and a web server 120n.

The server 115 is connected to the network 110. The server 115 is in electronic communication through the network 110 with the web servers, for example the web server 120a and the web server 120n. The web servers can be located remotely with respect to the server 115. Each web server can host one or more websites on the network 110. Each website can have multiple web pages. Examples of the network 110 include, but are not limited to, Ethernet, a Local Area Network (LAN), a Wireless Local Area Network (WLAN), a Wide Area Network (WAN), internet, and a Small Area Network (SAN).

The server 115 is also in communication with an electronic device (not shown) of a user, for example the user 105a, via the network 110. The electronic device can be remotely located with respect to the server 115. Examples of the electronic device include, but are not limited to, desktops, laptops, hand held computers, mobile devices, personal digital assistants (PDAs), smart phones, digital television (DTV), internet protocol television (IPTV), and play stations.

In some embodiments, the server 115 can perform functions of the electronic device. The server 115 has access to the web sites hosted by the web servers, for example the web server 120a and the web server 120n. In some embodiments, the server 115 is functionally similar to the web server 120a or the web server 120b and vice versa.

A user, for example the user 105a, can enter a web request on a website hosted by the web server 120a, via the electronic device. The server 115 processes the web request entered by the user. Upon processing, the server 115 obtains a web response, for example one or more feeds, associated with the web request. The feeds are uploaded by the server 115 for user access. The feeds provide updated information regarding the web request entered by the user. Examples of the feeds include, but are not limited to, news feeds, sports feeds, audio feeds, video feeds, and blog entries. Similarly, multiple users can enter multiple web requests simultaneously. Hence, the feeds obtained by the server 115 allow the user 105a to obtain thorough knowledge about the web request.

In one example, Hadoop is utilized for processing the queries entered by the user 105a. Hadoop is as a cloud computing infrastructure that enables distributed parallel processing. Hadoop includes Hadoop MapReduce and Distributed File System. Workflow system on Hadoop is established, for example using the technique described in U.S. patent application Ser. No. 12/133,965 entitled "COMPUTING PLATFORM FOR STRUCTURED DATA PROCESSING" filed on Jun. 5, 2008 and assigned to Yahoo! Inc., which is incorporated herein by reference in its entirety.

Figure 2:
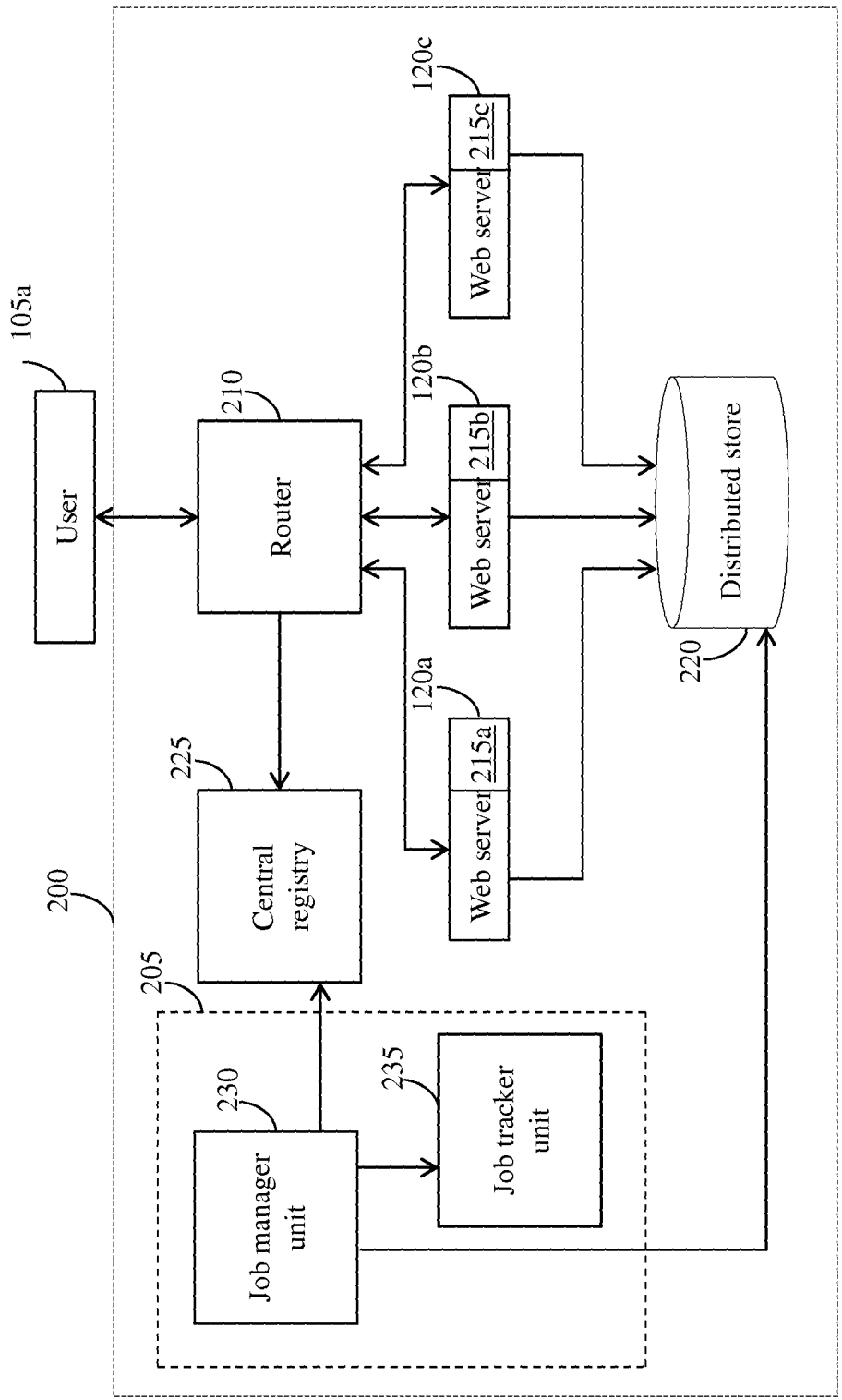
FIG. 2 is a block diagram of a system for building an elastic cloud web server farm, in accordance with one embodiment.

The server 115 along with the web servers are explained in detail in FIG. 2.

FIG. 2 is a block diagram of a system 200 for building an elastic cloud web server farm, in accordance with one embodiment.

The system 200, built on a cloud computing platform, is utilized for processing numerous web applications. In one example, Hadoop is utilized for establishing the system 200. The system 200 includes multiple grids, for example Hadoop grids. The system 200 deploys the web applications on a single grid in order to increase capacity of processing. The system 200 provides elasticity while deploying the numerous web applications.

In one example, sports feeds possess high load during important events, for example the cricket world cup. The system 200 is capable of processing the high load by deploying the web applications in the single grid. In another example, news feeds possess data size in a range of kilobytes and bears a service level agreement (SLA) in seconds. The system 200 processes the news feeds, for example 1500 news feeds per minute, by executing multiple processes simultaneously.

The system 200 provides isolation while processing the web applications simultaneously. In one example, if a first web application requires varied amount of memory then the system 200 allocates optimum memory required by the first web application without affecting other web applications. The system 200 dynamically allocates the optimum memory required by the first web application. Further, the system 200 provides isolation by deploying a web application in the context of a single process.

The system 200 includes a process coordinator 205, a router 210, a distributed store 220, and a central registry 225. The system also includes one or more web servers, for example the web server 120a, the web server 120b, and the web server 120c. Each web server includes a map web engine, for example the web server 120a includes a map web engine 215a, the web server 120b includes a map web engine 215b, and the web server 120c includes a map web engine 215c. The process coordinator 205 and the central registry 225 can be included in the server 115. The process coordinator 205 is coupled between the central registry 225 and the distributed store 220. Each web server is coupled between the router 210 and the distributed store 220. The process coordinator 205 further includes a job manager unit 230, and a job tracker (JT) unit 235. The job manager unit 230 is coupled to the distributed store 220 and the JT unit 235. The central registry 225 is coupled between the job manager unit 230 and the router 210.

A plurality of web applications is registered on a serving cloud by the job manager unit 230. A system interface, for example a Servlet application programming interface (API), is used and the web applications are packaged using WebARchive (WAR). The job manager unit 230 copies the web applications onto the distributed store 220. The web applications are thereby deployed on a grid, for example a Hadoop grid. The grid runs web servers using computing nodes of Hadoop. The job manager unit 230 also specifies a load of the web application and adds a plurality of nodes for the web application based on the load, in the central registry 225.

Each of the map web engines initializes a web server corresponding to a node, for example the map web engine 215a initializes the web server 120a.

In some embodiments, the job manager unit 230 generates a job associated with a node and transmits the job to the JT unit 235, for example a Hadoop JT unit. The job, for example a Hadoop job, is generated for a map task that is associated with a particular web server and a particular web application.

The job manager unit 230 registers a watcher with the central registry 225 in order to receive notifications in case one of the web servers become unresponsive. The job manager unit 230 also runs a monitor thread that periodically checks that the number of the web servers is consistent with a number configured in the central registry 225. In some embodiments, if the number of the web servers is more, the job manager unit 230 kills the job running the corresponding web servers. If the number of the web servers is low, the job manager unit 230 generates new jobs.

The central registry 225 maintains a list of available web servers. Each web server is further registered with the central registry 225 as a node in a format of 'hostname:port'. The node is a server instance that is identified by an identifier of hostname and port. The central registry 225 is a high performance coordination service for distributed web applications. The central registry 225 also maintains information of jobs that run the web applications. The central registry 225 can scale up to hundreds of thousands of transactions per second on a majority read system, for example the system 200, due to local reads and lock-free properties. The central registry 225 is explained in detail in conjunction with FIG. 4.

The router 210 is a single entry point of the system 200 which receives a web request from a user, for example the user 105a. The router 210 listens on a unique port and is seen as a standard web server. The router 210 selects the web server 120a from the list of available web servers, for example the web server 120a, the web server 120b, and the web server 120c, in the central registry 225. The router 210 then transmits the web request synchronously to the web server 120a in the map web engine 215, to process the web request. The router 210 further transmits a web response, based on the web request, back to the user.

In some embodiments, the router 210 retransmits the web request to another web server from the list of available web servers to handle failure of the web server.

Each map web engine maps each web application to a corresponding web server. The map web engine 215a is an implementation of a map task, for example a Hadoop map task. The map web engine 215a starts, monitors, and stops the web servers. In some examples, the web server 120a can be a Jetty web server, a Tomcat web server, or a Grizzly web server which implement the Servlet API.

The map web engine 215a opens a session for lifetime of the web server 120a. A free port from a predetermined range of ports is determined and the web server 120a is started. The web server 120a is registered with the central registry 225 by creating an ephemeral node (hostname:port) or the identifier that is automatically deleted on termination of the session. The map web engine 215a also registers a shutdown hook for the easy shutdown on receiving a job kill signal. As the web application can run on any machine in a cluster of machines, generated log files are spread across the grid. In some embodiments, a custom log4j appender that rolls over the log files onto a common location in the distributed store 220 is developed. One of standard grid based aggregation tools can further be used.

In some embodiments, the distributed store 220 used is a Hadoop distributed file system (HDFS). The Hadoop Distributed File System (HDFS) is defined as a primary storage system used by Hadoop applications.

Figure 3:
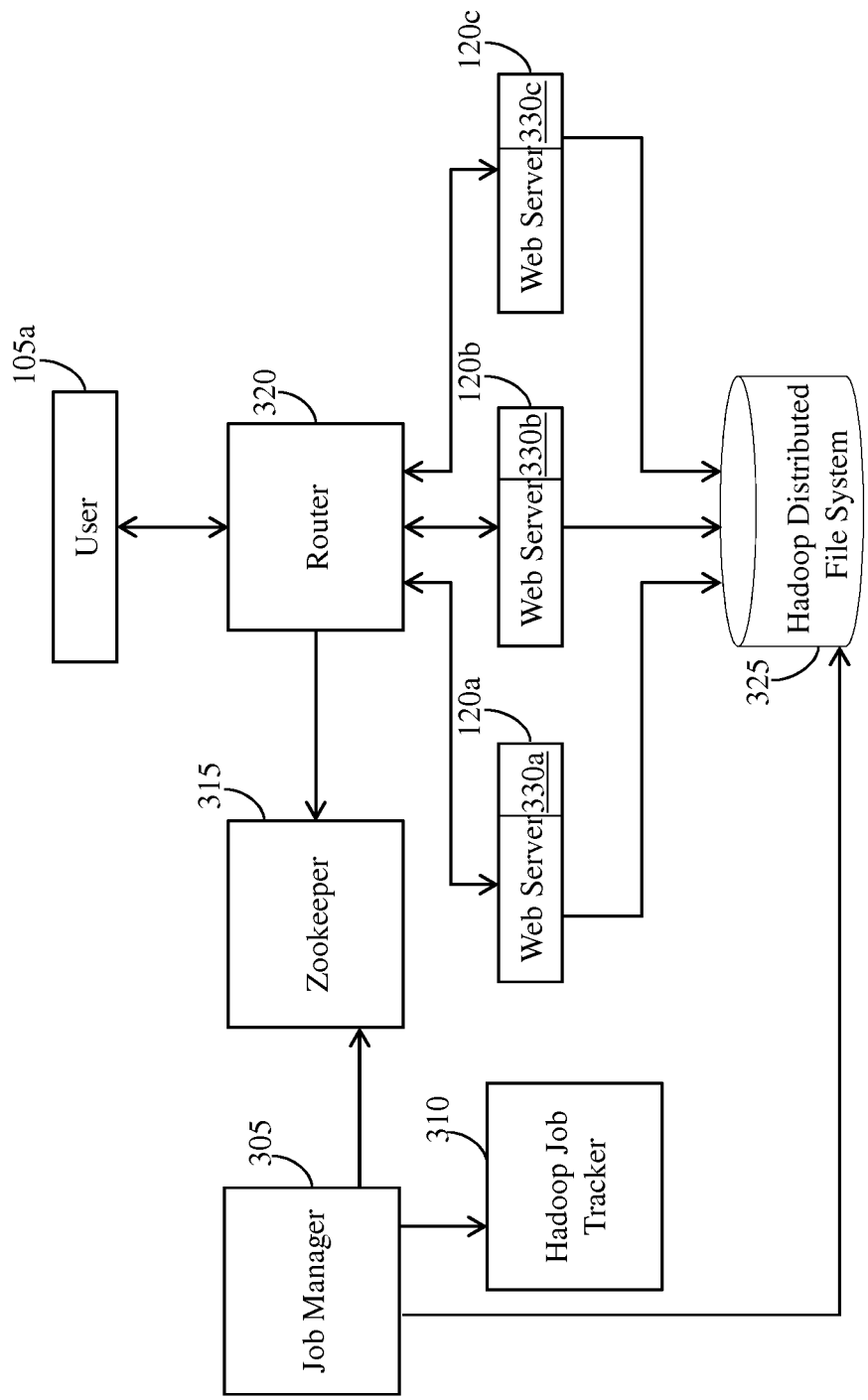
FIG. 3 is an exemplary illustration of a system, in accordance with one embodiment.

An exemplary illustration of the system 200 is described in conjunction with FIG. 3.

FIG. 3 is an exemplary illustration of the system 200, in accordance with one embodiment.

FIG. 3 includes a job manager 305, a Hadoop job tracker 310, a Zookeeper 315, a router 320, a Hadoop distributed file system 325, and one or more web servers, for example the web server 120a, the web server 120b, and the web server 120c. Each web server includes a map web engine, for example the web server 120a includes a map web engine 330a, the web server 120b includes a map web engine 330b, and the web server 120c includes a map web engine 330c. The job manager 305 is coupled between the Hadoop distributed file system 325 and the Zookeeper 315, and to the Hadoop job tracker 310. Each web server is coupled between the router 320 and the Hadoop distributed file system 325. The Zookeeper 315 is further coupled between the job manager 305 and the router 320.

A plurality of web applications is registered on a serving cloud by the job manager 305. A system interface, for example a Servlet application programming interface (API), is used and the web applications are packaged using WebARchive (WAR). The job manager 305 copies the web applications to the Hadoop distributed file system 325. The web applications are thereby deployed on a Hadoop grid that runs web servers using computing nodes of Hadoop. The job manager 305 also specifies a load of the web application and adds a plurality of nodes for the web application based on the load, in the Zookeeper 315.

Each of the map web engines initializes a web server corresponding to a node, for example the map web engine 330a initializes the web server 120a.

In some embodiments, the job manager 305 generates a job associated with a node and transmits the job to the Hadoop job tracker 310.

The router 320 receives a web request from a user, for example the user 105a. The router 320 selects the web server 120a from the list of available web servers, for example the web server 120a, the web server 120b, and the web server 120c, in the Zookeeper 315. The router 320 then transmits the web request synchronously to the web server 120a, to process the web request. The router 320 further transmits a web response, based on the web request, back to the user.

In some embodiments, the router 320 retransmits the web request to another web server from the list of available web servers to handle failure of the web server.

Figure 4:
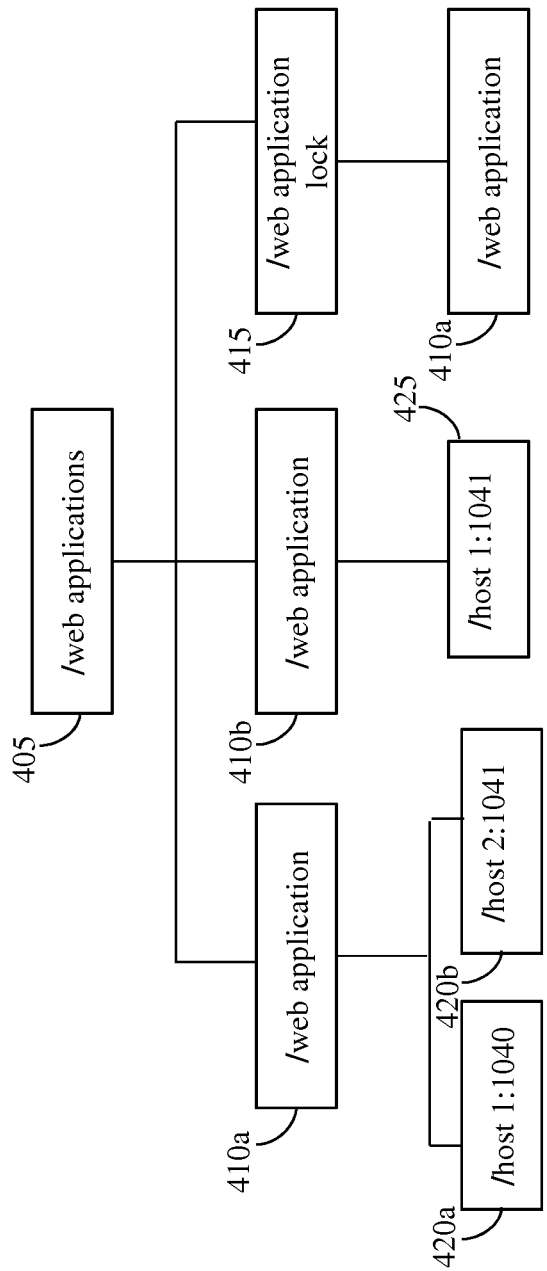
FIG. 4 is a block diagram illustrating working of a central registry, in accordance with one embodiment.

FIG. 4 is a block diagram illustrating working of the central registry 225, in accordance with one embodiment.

The central registry 225 stores large number of tasks that are utilized for deploying the web applications 405. Examples of the web applications 405 include, but are not limited to, the web application 410a and the web application 410b. The central registry 225 is capable of scaling thousands of reads per second. The web applications 405, associated with the central registry 225, initiates a session with the central registry 225. The session includes an associated time period defined as a time-out. The central registry 225 includes a number of ports. Execution of the tasks commences by associating each web application, for example the web application 410a, with a free port of the central registry 225. The free port of the central registry 225 is selected from a predetermined range. The central registry 225 considers the web application 410a as faulty when it does not receive any updates from the web application 410a within the time-out. Upon determining the web application 410a as faulty, the central registry 225 ends the session initiated by the web application 410a.

Upon obtaining the free port, the web application 410a gets registered with the central registry 225. Registration is performed by creating a coordinator node for the web application 410a. Similarly, another coordinator node can be created for the web application 410b. Each coordinator node is a memory data node that can be organized in a hierarchical manner referred to as a data tree.

The central registry 225 deploys various web applications, for example the web application 410a and the web application 410b. The central registry 225 utilizes a pipeline architecture for storing a list of web applications that requires to be processed. The web requests are uniformly distributed by the central registry 225 using a randomized algorithm across all the nodes for the web application 410a or the web application 410b. The web requests that are stored in a pipeline are further processed in First-In-First-Out (FIFO) order.

The central registry 225 also provides caching. The caching enables the web application, for example the web application 410a, to increase the performance of a read operation. In one example, the priority web application can be cached so that a task running the web application 410a is restrained from probing the central registry 225 every time the task needs to determine the priority web application stored in the pipeline. The central registry 225 utilizes a watch process for caching. The watch process provides notifications on any updates of the web applications 405 present in the pipeline.

The list of web applications present in the pipeline submits requests to the central registry 225 through an application programming interface (API). The API is further associated with a process coordinator library for managing network connections between the list of web applications and the central registry 225. The coordinator nodes can be utilized for manipulating the API associated with the central registry 225. In one example, the coordinator nodes can be defined using UNIX notation. Each of the coordinator nodes creates two sub-coordinator nodes, a sub-coordinator node 420a and a sub-coordinator node 420b until the corresponding coordinator node deploys the web application 410a. Similarly, the other coordinator node creates a sub coordinator node 425 until the web application 410b is deployed.

The central registry 225 is also utilized for providing locking features. The locking features are required for maintaining consistency to update the registry sequentially. In one example, to acquire the lock, the web application 410a creates a web application lock 415. The web application lock 415 can be created by associating an ephemeral flag with the coordinator node. If the creation of the web application lock 415 succeeds, then the web application 410a holds the web application lock 415. Further, if the creation of web application lock 415 does not succeed, then the web application 410a can wait for notification.

Figure 5:
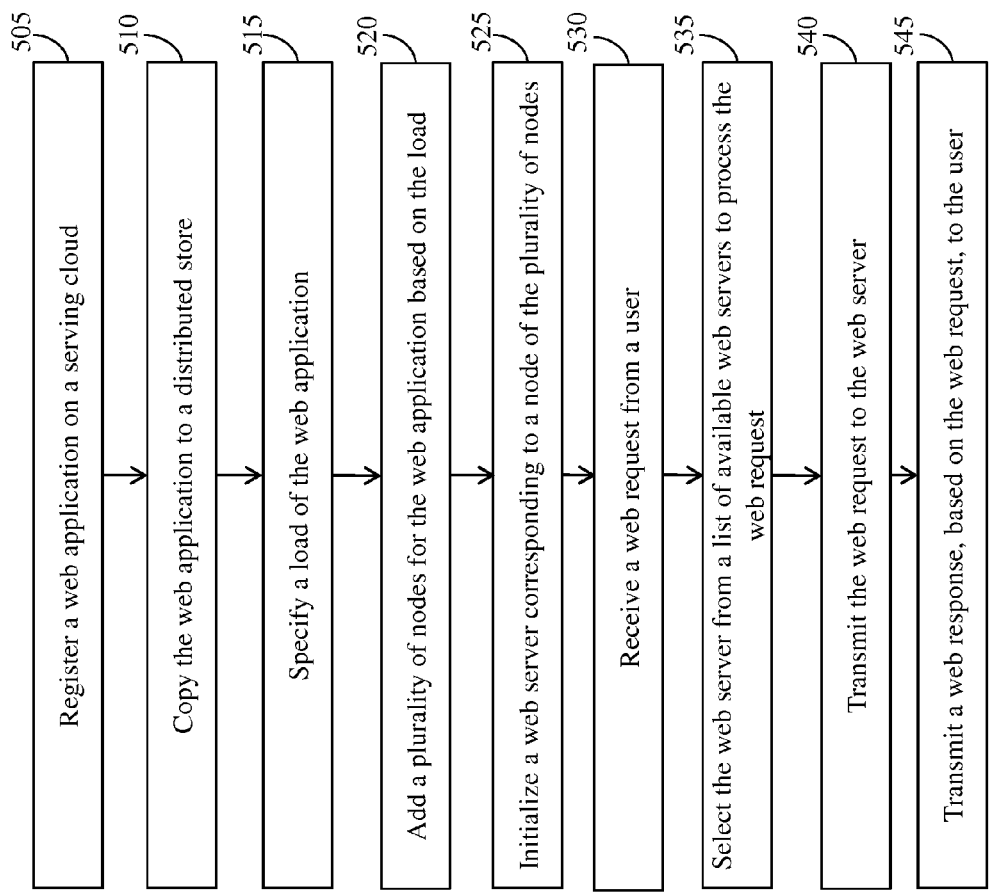
FIG. 5 is a flowchart illustrating a method of building an elastic cloud web server farm, in accordance with one embodiment.

FIG. 5 is a flowchart illustrating a method of building an elastic cloud web server farm, in accordance with one embodiment.

At step 505, a web application is registered on a serving cloud. The web application is one of a plurality of web applications that is registered on the serving cloud. The web applications are also processed simultaneously. The web applications can be packaged using WebARchive (WAR), and system interface is also used, for example a Servlet application programming interface (API).

At step 510, the web application is copied to a distributed store, for example the distributed store 220. The web application is copied to the distributed store using the job manager unit, for example the job manager unit 230. In one example, the distributed store can be a Hadoop distributed store or a Hadoop distributed file system (HDFS). The web applications are hence deployed on a grid, which runs web servers using computing nodes of Hadoop.

At step 515, a load of the web application is specified by the job manager unit, for example the job manager unit 230. The load is specified in a central registry, for example the central registry 225. Increase in the load can be dynamically handled by increasing number of web servers required for the web application. Similarly, decrease in the load can be dynamically handled by decreasing number of the web servers required for the web application.

At step 520, a plurality of nodes is added for the web application based on the load. The nodes are added by the job manager unit, for example the job manager unit 230, in the central registry, for example the central registry 225.

In some embodiments, the web application is mapped to a web server, corresponding to a node of the plurality of nodes, after addition of the nodes. The mapping is performed by the central registry.

At step 525, the web server corresponding to the node of the plurality of nodes is initialized. A port is determined from a predetermined range of ports, and an identifier is registered with the central registry. The identifier can be defined with a hostname and port. A number of the web servers that run with an optional schedule are associated as metadata of each node.

At step 530, a web request is received from a user, for example the user 105a. In one example, the web request is a hyper text transfer protocol (HTTP) web request. The web request is received by a router, for example the router 210. A plurality of web requests can also be received from other users, for example the user 105b and the user 105c.

At step 535, the web server, for example the web server 120a, is selected from a list of available web servers to process the web request. The list of available web servers is maintained by the central registry, for example the central registry 235. The web server is selected by the router, for example the router 210, which is seen as a standard web server.

At step 540, the web request is transmitted to the web server, for example the web server 120a, by the router.

In some embodiments, the web request is retransmitted to another web server from the list of available web servers to handle failure of the web server.

At step 545, a web response is transmitted back to the user, by the router. In one example, the web response is a HTTP response.

Figure 6:
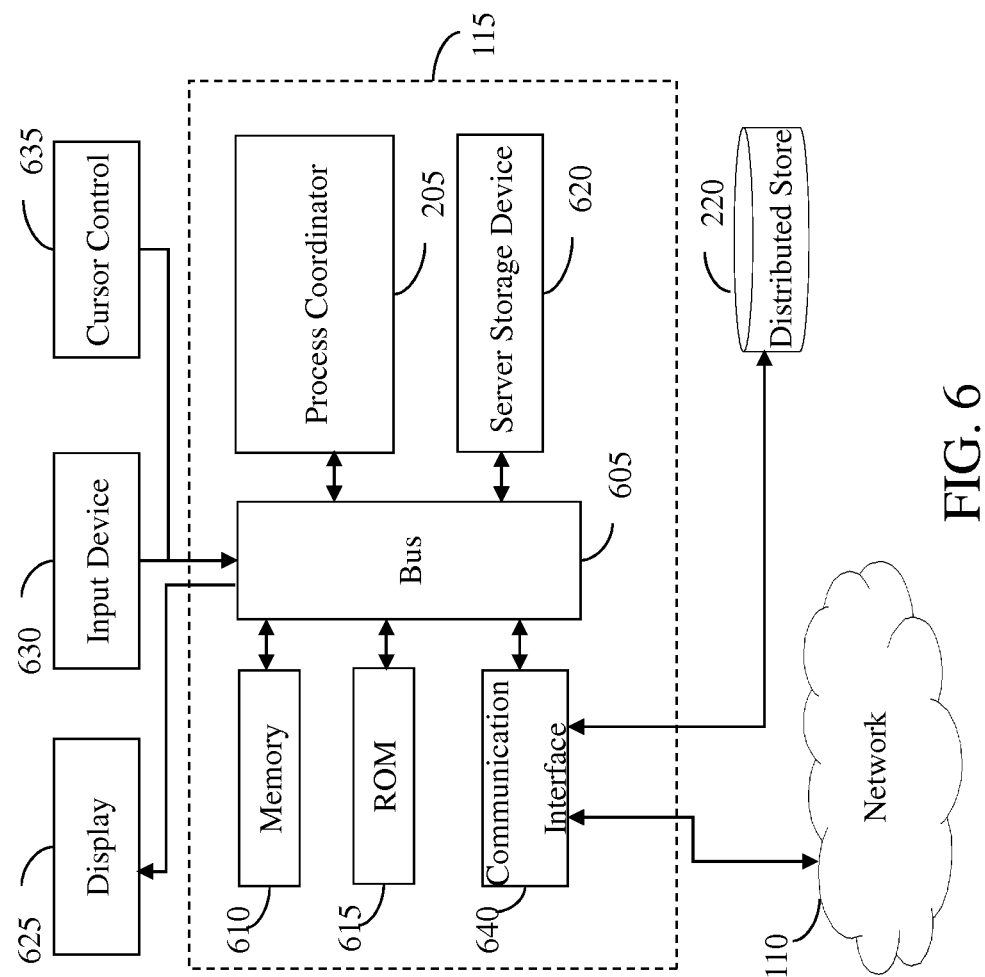
FIG. 6 is a block diagram of a server, in accordance with one embodiment.

FIG. 6 is a block diagram of a server, for example the server 115, in accordance with one embodiment. The server 115 represents each server in an elastic cloud web server farm. In some embodiments, the server 115 is functionally similar to the web server 120a or the web server 120b.

The server 115 includes a bus 605 for communicating information, and a process coordinator 205 coupled with the bus 605. The server 115 also includes a memory 610, for example a random access memory (RAM) coupled to the bus 605 for storing instructions to be executed by the process coordinator 205. The memory 610 can be used for storing temporary information required by the process coordinator 205. The server 115 can further include a read only memory (ROM) 615 coupled to the bus 605 for storing static information and instructions for the process coordinator 205. A server storage device 620, for example a magnetic disk, hard disk or optical disk, can be provided and coupled to the bus 605 for storing information and instructions.

The server 115 can be coupled via the bus 605 to a display 625, for example a cathode ray tube (CRT) or a liquid crystal display (LCD), for displaying information. An input device 630, for example a keyboard, is coupled to the bus 605 for communicating information and command selections to the process coordinator 205. In some embodiments, cursor control 635, for example a mouse, a trackball, a joystick, or cursor direction keys for command selections to the process coordinator 205 and for controlling cursor movement on the display 625 can also be present.

In one embodiment, the steps of the present disclosure are performed by the server 115 in response to the process coordinator 205 executing instructions included in the memory 610. The instructions can be read into the memory 610 from a machine-readable medium, for example the server storage device 620. In alternative embodiments, hard-wired circuitry can be used in place of or in combination with software instructions to implement various embodiments.

The term machine-readable medium can be defined as a medium providing content to a machine to enable the machine to perform a specific function. The machine-readable medium can be a storage media. Storage media can include non-volatile media and volatile media. The server storage device 620 can be non-volatile media. The memory 610 can be a volatile medium. All such media must be tangible to enable the instructions carried by the media to be detected by a physical mechanism that reads the instructions into the machine.

Examples of the machine readable medium include, but are not limited to, a floppy disk, a flexible disk, hard disk, magnetic tape, a CD-ROM, optical disk, punchcards, papertape, a RAM, a PROM, EPROM, and a FLASH-EPROM.

The machine readable medium can also include online links, download links, and installation links providing the instructions to be executed by the process coordinator 205.

The server 115 also includes the communication interface 640 coupled to the bus 605 for enabling communication. Examples of the communication interface 640 include, but are not limited to, an integrated services digital network (ISDN) card, a modem, a local area network (LAN) card, an infrared port, a Bluetooth port, a zigbee port, and a wireless port.

The server 115 is also connected to the distributed store 220 that stores web applications.

In some embodiments, the process coordinator 205 can include one or more processing devices for performing one or more functions of the process coordinator 205. The processing devices are hardware circuitry performing specified functions.

The present disclosure provides easy deployment of web applications. The system 200 has high throughput by ensuring that the web applications are copied onto HDFS, launching of Hadoop jobs and initialization of the web server, are performed during deployment The system 200 also has increased scalability of web applications due to addition of Hadoop nodes. Each web application runs in isolation, without overhead and cost of managing virtual machines. The system 200 further shares resources and has improved reliability. The features of the present disclosure are provided in detail below:

1. Scalability—The present disclosure provides scalability on two dimensions, one when a web application handles load in an elastic manner by configuring a higher number of instances, and when the system scales with addition of nodes to a Hadoop cluster.
2. Performance—The present disclosure achieves high throughput by ensuring that the steps of copying the web application to the distributed store, launching of Hadoop jobs and initialization of the web server are done during deployment. Processing pipeline of the web requests has minimal overhead, as performing a registry lookup and redirecting a web request to an actual web server, is only involved.
3. High Availability and Self-healing—The map web engine periodically sends a web requests to the web servers and sends progress to the job tracker unit only on receipt of a web response. The job tracker unit restarts the map task in case the web server becomes unresponsive, thus ensuring self-healing. Configuring more tasks for the web applications achieves reliability. All the components are themselves stateless with the global state maintained in the central registry. The central registry is also used to coordinate between different instances of the job manager unit by using a web application lock. Multiple instances of the router and the job manager unit are run behind a load balancer to achieve scalability and high availability.
4. Isolation—Isolation is critical as user code is executed and hence any resource contention with other web applications needs to be managed. The mapping provides process isolation for every web application. For example, a memory leak associated with a web application can happen, but will not affect other web applications as each web application has a Java Virtual Machine (JVM). Hence, the web applications can bundle different versions of native libraries. A common problem with server farms is the need to plan for dedicated resources at peak load. The present disclosure overcomes the problem by allotting exclusive web servers per web application.
5. Ease of Development—As the standard Servlet API and WAR are used for packaging, the developers have the freedom to use widely available tools and IDEs to build, test and debug the web application. The web application can then be deployed without any change.
6. Reuse of Grid Infrastructure—The present disclosure runs on a Hadoop grid that is shared across several applications. The use of Hadoop leverages its features of load balancing, task monitoring, and resource scheduling.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method of building an elastic cloud web server farm to support cloud computing availability to users, the method comprising:
   registering, by a processor, a web application having functionality on a serving cloud;
   copying, by the processor, the web application to a distributed store that stores a plurality of web applications;
   specifying, by the processor, a load of the web application in a central registry,
   the central registry maintains information related to jobs that run the web applications, stores tasks utilized for deploying the web applications, and maintains a pipeline architecture for storing web requests;
   adding, by the processor in the central registry, a plurality of nodes for the web application based on the load, the adding being done by a job manager unit which specifies a load of the web application and periodically checks the number of web servers;
   mapping, by the central registry, the web application to a web server corresponding to a node of the plurality of nodes;
   initializing, by the processor, the web server;
   receiving, by the processor, a web request for access to functionality of the web application from a user;
   selecting, by the processor, the web server from a list of available web servers to process the web request;
   transmitting, by the processor, the web request for access to functionality of the web application to the web server; and
   transmitting, by the processor, a web response, based on the web request for access to functionality of the web application, to the user.

2. The method as claimed in claim 1 and further comprising:
   processing a plurality of web applications simultaneously.

3. The method as claimed in claim 1, wherein specifying the load comprises one of:
   dynamically handling an increase in the load by increasing number of web servers required for the web application; and
   dynamically handling a decrease in the load by decreasing number of the web servers required for the web application.

4. The method as claimed in claim 1, wherein initializing the web server comprises:
   determining a port from a predetermined range of ports; and
   registering an identifier with the central registry, the identifier being defined with a hostname and port.

5. The method as claimed in claim 1 and further comprising:
   maintaining the list of available web servers by the central registry.

6. The method as claimed in claim 1, wherein the web request is retransmitted to another web server from the list of available web servers to handle failure of the web server.

7. The method as claimed in claim 1, wherein registering a web application comprises
   packaging the web application using a file format for saving and reviewing complete web pages.

8. A non-transitory computer-readable storage medium that when executed by a processor, performs a method of building an elastic cloud web server farm to support cloud computing availability to users, comprising:
   registering a web application having functionality on a serving cloud;
   copying the web application to a distributed store that stores a plurality of web applications;
   specifying a load of the web application in a central registry,
   the central registry maintains information related to jobs that run the web applications, stores tasks utilized for deploying the web applications, and maintains a pipeline architecture for storing web requests;
   adding, in the central registry, a plurality of nodes for the web application based on the load, the adding being done by a job manager unit which specifies a load of the web application and periodically checks the number of web servers;
   mapping, by the central registry, the web application to a web server corresponding to a node of the plurality of nodes;
   initializing the web server;
   receiving a web request for access to functionality of the web application from a user;
   selecting the web server from a list of available web servers to process the web request;
   transmitting the web request for access to functionality of the web application to the web server; and
   transmitting a cloud-computed web response, based on the web request for access to functionality of the web application, to the user.

9. The medium as claimed in claim 8 and further comprising:
   processing a plurality of web applications simultaneously.

10. The medium as claimed in claim 8, wherein specifying the load comprises one of:
    dynamically handling an increase in the load by increasing number of web servers required for the web application; and
    dynamically handling a decrease in the load by decreasing number of the web servers required for the web application.

11. The medium as claim in claim 8, wherein initializing the web server comprises:
    determining a port from a predetermined range of ports; and
    registering an identifier with the central registry, the identifier being defined with a hostname and port.

12. The medium as claimed in claim 8 and further comprising:
    maintaining a list of available web servers by the central registry.

13. The medium as claimed in claim 8, wherein the web request is transmitted to another web server from the list of available web servers to handle failure of the web server.

14. The medium as claimed in claim 8, wherein registering a web application comprises
    packaging the web application using a file format for saving and reviewing complete Web pages.

15. A system for building an elastic cloud web server farm to support cloud computing availability to users, the system comprising:
    a central registry that maintains a list of available web servers;

a distributed store that stores a plurality of web applications having functionality, the distributed store storing a plurality of web applications,
wherein the central registry maintains information related to jobs that run the web applications, stores tasks utilized for deploying the web applications, and maintains a pipeline architecture for storing web requests;
a process coordinator that
 registers a web application having functionality on a serving cloud;
 copies the web application to the distributed store;
 specifies a load of the web application in the central registry;
 adds, in the central registry, a plurality of nodes for the web application based on the load, the adding being done by a job manager unit which specifies a load of the web application and periodically checks the number of web servers;
one or more web servers, each web server comprising:
 a map web engine that
  maps, by the central registry, the web application to a web server corresponding to a node of the plurality of nodes;
  initializes the web server;
 a router that
  receives a web request for access to functionality of the web application from a user;
  selects the web server from the list of available web servers to process the web request for access to functionality of the web application;
  transmits the web request to the web server; and
  transmits a cloud-computed web response, based on the web request for access to functionality of the web application, to the user.

16. The system as claimed in claim 15, wherein the system is built on a cloud computing platform.

\* \* \* \* \*